UNITED STATES PATENT OFFICE.

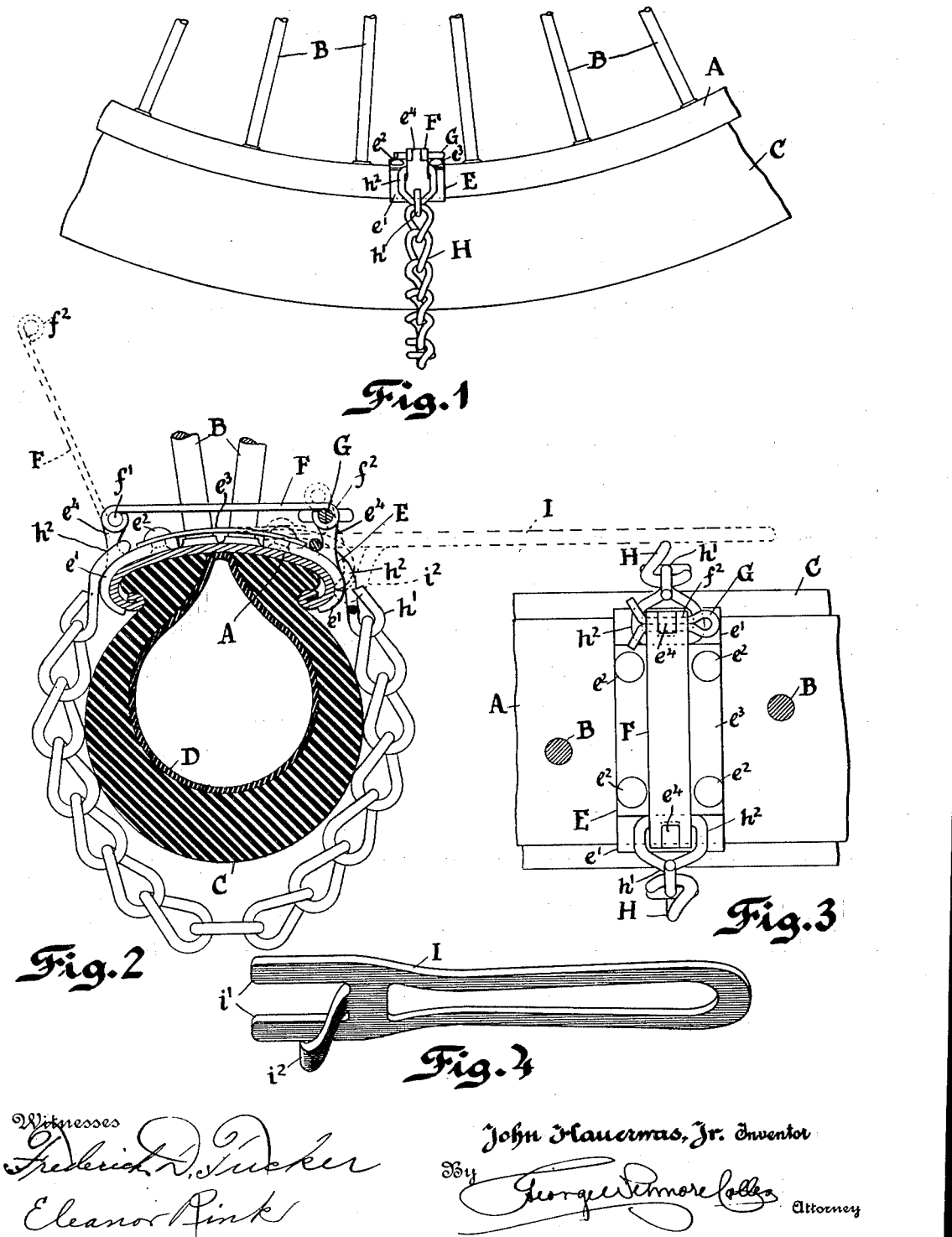

JOHN HAUERWAS, JR., OF MILWAUKEE, WISCONSIN.

NON-SKID DEVICE FOR MOTOR-CYCLES.

1,113,006.  Specification of Letters Patent.  Patented Oct. 6, 1914.

Application filed March 21, 1913. Serial No. 755,827.

*To all whom it may concern:*

Be it known that I, JOHN HAUERWAS, Jr., of Milwaukee, Wisconsin, have invented a Non-Skid Device for Motor-Cycles, of which the following is a specification.

This invention relates to vehicles, more particularly of the automobile class, provided with rubber tires, and the object thereof is to provide an easily attached and detachable form of antiskid chain.

My invention is especially intended for motor-bicycles but can also be used for other kinds of vehicles.

Briefly described, it comprises a detachable clip adapted to be secured upon the metal rim or felly of the wheel and a chain adapted to pass around the tire and having its ends secured to the clip; and I further provide means whereby the clips may be readily removed from the felly whenever desired.

My invention will best be understood from a consideration of the following detailed description, which relates to the accompanying drawing, wherein—

Figure 1 is a side elevation of the lower part of a wheel having my nonskid device attached thereto; Fig. 2 is a transverse section through the lower portion of the wheel showing my device in side elevation thereon; Fig. 3 is a plan-view of the device and a portion of the wheel-rim and tire as seen in Fig. 1, and Fig. 4 is a perspective of the device employed for removing the nonskid device from the wheel-rim.

The reference letters refer each to the same part in each figure of the drawings.

In the drawings, A represents the felly, B in the spokes, and C the inflatable outer tire of a vehicle-wheel, the latter inclosing the usual inner tube D as seen in Fig. 2.

My device comprises the clip E, which is constructed of two hook-shaped members $e'$ adapted to clip the opposite sides of the felly as shown, and united by rivets $e^2$ to a spring-plate $e^3$, which holds the members $e'$ in firm clipping-relation to the wheel. Each of the members $e'$ carries an upright perforated standard $e^4$, and one of the two standards carries the pivot-pin $f'$ of a bar F, which turns thereon. The bar F has its free end forked and turned into an eye at $f^2$ adapted to register with the transverse hole through the other standard $e^4$, so that in the full-line position of Fig. 2 a split-pin G may be inserted through the two holes to hold the bar F in said position.

The device is completed by a chain H, the end links $h'$ of which are provided each with a loop $h^2$ which fits over one of the opposite standards $e^4$, so that the chain hangs in the position shown, and, when the wheel is in motion, acts to prevent it from skidding laterally on the well-known principle of such chains.

It will be observed that the bar F performs the office not merely of holding the ends of the chain in place but also of holding the members $e'$ against spreading so that the clip cannot become detached from the wheel-rim. When it is desired to detach the device, the split-pin G is first removed, then the bar F is thrown up into the dotted-line position of Fig. 2, and then an instrument I, shown in Fig. 4, is applied to one side of the clip in the manner illustrated in dotted lines in Fig. 2, said instrument having two forked fingers $i'$ adapted to rest upon the inner side of the felly A on opposite sides of the clip and a downwardly bent hooked finger $i^2$, the pointed end of which is adapted to engage under the hooked end of one of the members $e'$ so that it forces this member up into the position shown in dotted lines in Fig. 2, when it easily springs off. The device is inserted in place by simply pressing it over the felly, with which it readily engages when the bar F is open.

Various changes and modifications in the constructions as herein shown may be made without departing from the spirit of my invention, and I wish it understood therefore that the latter is not otherwise limited than by the proper scope of my claims.

Having thus described my invention, what I claim as new and desire to secure by Letters Patent is:

1. The combination of a clip adapted to be detachably engaged with a wheel-rim and having a pair of inwardly extending projections, a chain adapted to pass around the wheel-tire, and having loops on its end-links adapted to engage said projections, and a strut-device connecting the ends of said projections.

2. The combination of a clip adapted to be detachably engaged with a wheel-rim and having a pair of projections on opposite sides of the rim, a chain adapted to pass around the wheel-tire, and having loops on its end-links adapted to engage said projections, and a strut-bar detachably connecting the ends of said projections and adapted to hold them at a fixed distance.

3. The combination of a clip adapted to be detachably engaged with a wheel-rim and having a pair of projections on opposite sides of the rim, a chain adapted to pass around the wheel-tire, and having loops on its end-links adapted to engage said projections, a strut-bar pivoted to one of said projections and having a free end adapted to lie adjacent to the other projection, and means for interengaging said free end and said other projection.

4. A device of the class described comprising a pair of hooked members adapted to engage on the opposite sides of a wheel-felly, a spring connecting them, and a bar adapted to engage said members to hold them in a fixed position relative to each other.

5. A device of the class described comprising a pair of hooked members adapted to engage the opposite sides of a wheel-felly, a plate-spring connecting them, a chain adapted to pass around the wheel-felly, and means on the respective members for engaging the respective ends of said chain.

6. A device of the class described comprising a pair of hooked members adapted to engage opposite sides of a wheel-felly, a plate-spring connecting them and adapted to press them into yielding engagement with said felly, said members having each an upright standard extending above said spring, a bar adapted to detachably connect the upper ends of said standards, a chain adapted to pass around the wheel-tire, and means on the opposite ends of said chain for engaging said standards.

7. A device of the class described comprising a pair of hooked members adapted to engage opposite sides of a wheel-felly, a plate-spring connecting them and adapted to press them into yielding engagement with said felly, said members having each an upright standard extending above said spring, a bar adapted to detachably connect the upper ends of said standards, and a chain adapted to pass around the wheel-tire, the end-links of said chain being adapted to be looped around said standards.

8. The combination of a clip having a resilient body and recurved ends adapted to engage around a wheel rim from the inner side of the rim whereby it is adapted to slide on the same, positive means for forcing said re-curved ends toward each other and into gripping engagement with the rim of a wheel, thus giving it a certain frictional hold upon the rim whereby the sliding movement is retarded, and a flexible connection passing around the tire-side of the rim and secured at opposite ends to said clip.

In witness whereof I have hereunto set my hand in the presence of two witnesses.

JOHN HAUERWAS, Jr.

Witnesses:
JOHN HAUERWAS, Sr.,
FRANK A. GRAHAM.